C. T. SCHOEN.
SHOCK ABSORBER FOR VEHICLES.
APPLICATION FILED MAR. 5, 1912.
1,038,446.
Patented Sept. 10, 1912.
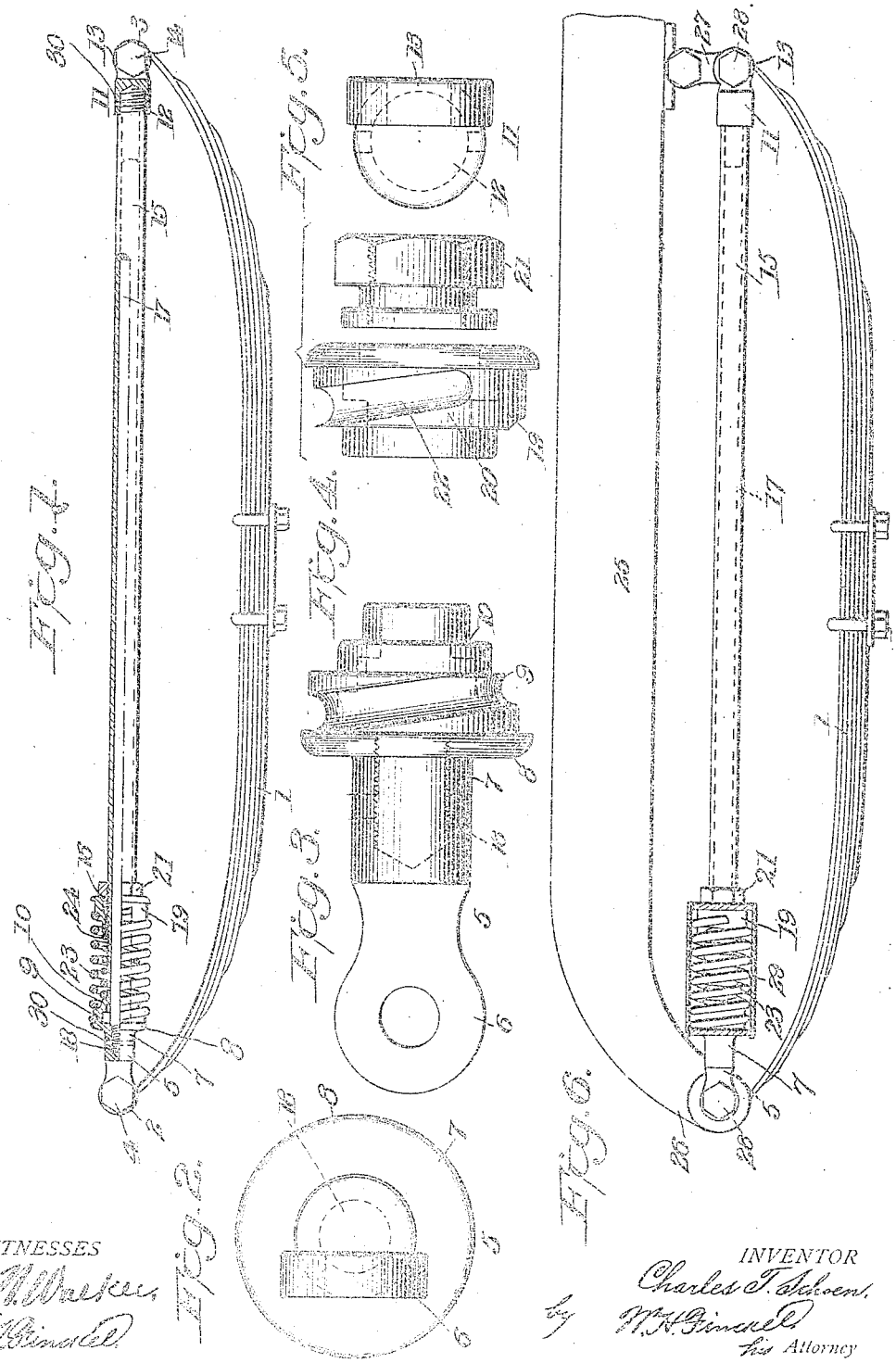
WITNESSES
INVENTOR
Charles T. Schoen,
by
his Attorney

UNITED STATES PATENT OFFICE.

CHARLES T. SCHOEN, OF MEDIA, PENNSYLVANIA.

SHOCK-ABSORBER FOR VEHICLES.

1,038,446.  Specification of Letters Patent. Patented Sept. 10, 1912.

Application filed March 5, 1912. Serial No. 681,860.

*To all whom it may concern:*

Be it known that I, CHARLES T. SCHOEN, a citizen of the United States, residing at Media, in the county of Delaware and State of Pennsylvania, have invented a certain new and useful Improvement in Shock-Absorbers for Vehicles, of which the following is a full, clear, and exact description.

The object of this invention is to provide a shock absorber for vehicles of simple and durable construction, and effective in operation, and which is particularly designed for use in connection with the elliptic springs of automobiles, for the purpose of minimizing the effect of the shocks to which such vehicles are subjected in traveling over rough and uneven roads.

The invention consists in a shock absorber comprising a spiral spring or springs and means for connecting and supporting the same between the scrolls or pivotal connections of the ordinary elliptic spring, all substantially as I will proceed now more particularly to set forth and finally claim.

In the accompanying drawings, illustrating the invention, in the several figures of which like parts are similarly designated, Figure 1 is a side elevation, partly in section, showing the invention applied to a semi-elliptic spring. Figs. 2 and 3 are an end view and a side elevation, respectively, on a larger scale, of the left-hand spring connection of Fig. 1. Fig. 4 is an elevation on a larger scale of the spring connection at the right-hand side of Fig. 1, with its swivel nut detached. Fig. 5 is an end view on a larger scale of the tube connection at the right-hand end pivotal connection of the elliptic spring. Fig. 6 is an elevation showing the shock absorber applied to the spring at the front end of an automobile frame and showing the shock absorber spring incased.

As shown in Fig. 1, 1 is the main spring, and as herein shown, it is of the semi-elliptic type, having at its opposite ends the pivot or scroll connections 2 and 3, and adapted to be connected with the vehicle in any suitable or usual manner.

Connected with the scroll end 2 of the elliptic spring by means of the bolt 4, is a casting 5, comprising an eye 6 and a head 7. The head 7 is provided with a flange 8, and beyond said flange with a spiral groove 9 to receive the end coil of a spiral spring to be referred to, and beyond said spiral groove with a stepped or shouldered portion 10 to form seats for the spiral springs to be referred to. A casting 11, having a screwthreaded socket 12 and an offset eye 13, is connected with the opposite scroll 3 of the main spring 1, by means of the pivot bolt 14. Fitted in the screwthreaded socket 12 of the casting 11 is a tube 15, provided at its free end with a screwthreaded portion 16.

A rod 17 fitted into a screwthreaded socket 18 in the head 7 is adapted to loosely fit within the tube 15. The tube 15 and rod 17 when thus fitted together and connected to opposite scrolls of the elliptic spring 1, are of sufficient length to span the distance between said scrolls, the tube 15 terminating within a short distance of the inner end of the casting 5, and having loosely mounted thereon a collar 19, suitably hollowed out as at 20, to receive a swivel nut 21, adapted to be fitted upon and engage the screwthreaded portion 16 of the tube 15. The collar 19 is also provided with a spiral groove 22 to receive the end coil of the spiral spring to be referred to.

Arranged between the casting 5 and the collar 19 is a spiral spring 23, with its end coils engaging and securely held by the spiral grooves 9 and 22, respectively, in the casting 5 and collar 19, the coils of the spring 23 surrounding the telescoping tube 15 and rod 17. Preferably, a second and smaller spiral spring 24 is arranged upon the telescoping tube 15 and rod 17 within the spring 23, and having its end coils engaging the casting 5 and collar 19, respectively.

As one illustration of the application of the invention, I have shown in Fig. 6 the shock absorber applied to a semi-elliptic spring attached to the front end of an automobile frame. In said figure, 25 is the frame, and it will be observed that the elliptic spring is rigidly attached to the front end 26 of the frame 25 and at its other end is connected to the frame 25 by means of a swinging link 27, the shock absorber being attached to the outside of the semi-elliptic spring through its castings 5 and 11, by means of the pivot bolts 28 engaging said castings and the end scrolls of the elliptic spring. By this arrangement, it will be observed that the attachment of the spring and its shock absorber at the front of the automobile will not in any way interfere with or disturb the usual cranking handle used to start the engine. However, it is evident that the elliptic spring and its attached shock absorber may be equally well applied upon the inside of the frame. In Fig. 6, I have also shown the coiled spring of the shock absorber incased in a casing 29 suitably mounted to permit a sliding movement of the casing upon one of its end caps, for protecting the spring from mud and ice, and also to produce a neat and sightly finish to the device. The rod 17 and tube 15 may be further and permanently fixed in their castings or connections 5 and 11, respectively, by means of transverse pins 30, as shown in Fig. 1.

The operation is as follows: When the vehicle is traveling over rough or uneven roads, and the elliptic spring is in action and depressed by the load of the vehicle, the distance between the scroll ends of the elliptic spring increases and thereby causes a pull upon the spiral spring 23, the telescopic connection between the tube 15 and the rod 17 and their connections with the spiral springs effecting a pull upon the spiral spring 23 and thereby absorbing the shocks due to the jolting of the vehicle. On the other hand, if the spiral springs are slightly compressed when the elliptic springs are in normal position, they will resist the rebound of the elliptic spring, and thus gradually bring it to a stop in its rebound or upward movement, because of the distance between the scroll ends of the elliptic spring decreasing as it assumes its normal position. Thus, as the elliptic spring is constantly increasing and decreasing in length between its scroll ends, when in action, the spiral springs are automatically checking the rebound and holding the vehicle suspended on the elliptic springs in a practically steady condition and without shock. The telescopic tube 15 and rod 17 and their attached castings and spring connections, not only serve to hold and support the springs 23 and 24 in place, but also serve to act as a guide for the action of the springs 23 and 24, the rod 17 serving to stiffen the tube against bending. By adjusting the swivel nut 21 upon the screw-threaded end of the tube 15, the connection between the scroll ends of the elliptic spring may be lengthened or shortened to suit the distance from center to center of the scroll ends of the elliptic spring to which the shock absorber is attached, and after attaching the ends the said swivel nut may be adjusted to compress the spiral springs 23 and 24 to any desired tension. The inner spiral spring 24 offers an additional resistance only to the recoil of the elliptic spring, while the outer spiral spring 23 offers resistance to both the down thrust and the recoil from a normal position. In other words, the principal purpose of the absorber is to check the rebound or recoil of the elliptic spring by compressing the spiral springs through the swivel nut. By this arrangement no resistance is offered to the elliptic spring on the down thrust until the compression of the spiral springs is entirely exhausted, and then the outer spring 23 only will operate to take what pull there may be, thus offering resistance at the point of the greatest stress in the elliptic spring.

By this construction a shock absorber of very simple and durable construction is provided, and one which is effective in operation; and furthermore, there are few or no wearing parts which need adjustment. Also by this construction a shock absorber is provided which may readily be applied to the elliptic or semi-elliptic springs already in use.

I do not wish to be understood as limiting my invention to the exact details of construction herein shown and described, as the same may be changed in various particulars without altering the scope of the invention. Furthermore, I do not wish to limit the invention to its use in connection with semi-elliptic springs as herein shown and described, as it is equally applicable to elliptic or other springs.

What I claim is:—

1. A shock absorber, comprising essentially a tube and means to connect it with one end of a vehicle spring, a rod freely sliding within said tube and means to connect said rod with the other end of said spring, a collar mounted upon the free end of the tube, and a spiral spring secured to the collar and to the rod connecting means, so that as the vehicle spring yields under load the spiral spring is extended and is compressed by the recoil of the vehicle spring to absorb the shock of the rebound as the load lifts from the vehicle spring.

2. A shock absorber, comprising essentially a tube and means to connect it with one end of a vehicle spring, a rod freely sliding within said tube and means to connect said rod with the other end of said spring, a collar mounted upon the free end of the tube, a swivel nut in said collar and secured to the tube, and a spiral spring secured to the collar and to the rod connecting means, so that as the vehicle spring yields under load the spiral spring is extended and is compressed by the recoil of the vehicle spring to absorb the shock of the rebound as the load lifts from the vehicle spring.

3. A shock absorber, comprising essentially a tube and means to connect it with one end of a vehicle spring, a rod freely sliding within said tube and means to connect said rod with the other end of said spring, a collar mounted upon the free end of the tube, a spiral spring secured to the collar and to the rod connecting means, and a second spiral spring arranged loosely within the first named spiral spring and acting solely by compression, so that as the vehicle spring yields under load the spiral spring is extended and is compressed by the recoil of the vehicle spring to absorb the shock of the rebound as the load lifts from the vehicle spring, the inner spiral spring aiding in such absorption.

4. A shock absorber, comprising a tube, having a screwthreaded portion at its inner end, a rod fitted to slide in said tube and provided at its outer end with means for connection with the end coil of a spiral spring, a nut mounted upon the screwthreaded end of said tube, a spring connection loosely mounted upon said tube for engaging the other end of said spiral spring and swiveled to said nut, a spiral spring interposed between and connected to said spring connections, and means for connecting the free ends of said tube and rod with the scroll ends of an elliptic spring.

5. A shock absorber, comprising a tube, having a screwthreaded portion at its inner end, a rod fitted to slide in said tube and provided at its outer end with means for connection with the end coil of a spiral spring, a nut mounted upon the screwthreaded end of said tube, a spring connection loosely mounted upon said tube for engaging the other end of said spiral spring and swiveled to said nut, a spiral spring interposed between and connected to said spring connections, a casing for said spiral spring, and means for connecting the free ends of said tube and rod with the scroll ends of an elliptic spring.

6. A shock absorber, comprising a tube, having a screwthreaded portion at its inner end, a rod fitted to slide in said tube and provided at its outer end with a head having a spiral groove, a nut mounted upon the screwthreaded end of said tube, a collar loosely fitted upon said tube and having a spiral groove and swiveled to said nut, a spiral spring interposed between said head and collar and having its end coils engaging the spiral grooves thereon, and means for connecting the outer ends of the tube and rod to the scroll ends of an elliptic spring.

In testimony whereof I have hereunto set my hand this 4th day of March A. D. 1912.

CHARLES T. SCHOEN.

Witnesses:
T. W. BROOM,
W. B. REED.